United States Patent [19]
Beattie et al.

[11] Patent Number: 5,127,337
[45] Date of Patent: Jul. 7, 1992

[54] REACTION RAIL

[75] Inventors: William C. Beattie, Down, Ireland; W. John Ballantyne, Kingston, Canada

[73] Assignee: Urban Transportation Development Corp., Ltd., Toronto, Canada

[21] Appl. No.: 723,719

[22] Filed: Jun. 19, 1991

Related U.S. Application Data

[63] Continuation of Ser. No. 367,586, Jun. 19, 1989, abandoned, which is a continuation of Ser. No. 87,127, Aug. 18, 1987, abandoned, which is a continuation of Ser. No. 740,796, Jun. 3, 1985, abandoned.

[30] Foreign Application Priority Data

Apr. 24, 1985 [CA] Canada ................... 479933

[51] Int. Cl.$^5$ ............................................. H02K 41/02
[52] U.S. Cl. ..................................... 104/294; 104/290; 310/12; 318/135
[58] Field of Search ................. 104/287, 290, 294; 310/12, 13, 14; 318/38, 135, 687; 403/381; 191/32

[56] References Cited

U.S. PATENT DOCUMENTS

| | | | |
|---|---|---|---|
| 1,090,213 | 3/1914 | Johnson | 310/13 |
| 1,148,051 | 7/1915 | Rhinesmith | 238/73 |
| 1,253,896 | 1/1918 | Slack | 238/72 |
| 1,367,400 | 2/1921 | Kelley | 238/40 |
| 2,035,445 | 3/1936 | Banks | 191/32 |
| 2,579,011 | 12/1951 | Pieper | 403/381 |
| 3,135,879 | 6/1964 | Baumann | 310/13 |
| 3,612,395 | 10/1971 | English | 238/122 |
| 3,667,397 | 6/1972 | Haynes | 104/290 |
| 3,667,398 | 6/1972 | English | 104/294 |
| 3,749,025 | 7/1973 | Giraud | 104/290 |
| 3,906,261 | 9/1975 | Ogura et al. | 310/12 |
| 3,912,992 | 10/1975 | Lamb | 104/292 |
| 4,006,373 | 2/1977 | Ross | 310/13 |
| 4,210,831 | 7/1980 | Hurst | 310/13 |
| 4,303,017 | 12/1981 | Düll | 104/290 |
| 4,461,219 | 7/1984 | Bateson | 105/377 |

FOREIGN PATENT DOCUMENTS

| | | | |
|---|---|---|---|
| 2100146 | 3/1972 | France. | |
| 2192936 | 2/1974 | France. | |
| 2233739 | 1/1975 | France. | |
| 49-124502 | 4/1974 | Japan. | |
| 58-112086 | 7/1983 | Japan. | |
| 57-122183 | 7/1983 | Japan. | |
| 59-201671 | 4/1984 | Japan. | |
| 60-101355 | 11/1986 | Japan. | |
| 61-262068 | 11/1986 | Japan. | |
| 63-021173 | 8/1988 | Japan. | |
| 63-032623 | 8/1988 | Japan. | |
| 737278 | 5/1980 | U.S.S.R. | 104/293 |
| 995220 | 2/1983 | U.S.S.R. | 310/12 |

OTHER PUBLICATIONS

Fink et al., Standard Handbook for Electrical Engineers, 1978, pp. 23-104 to 23-120.
Fink et al., Standard Handbook for Electrical Engineers, May 1980, pp. 2-10.
The Operation of a Single-Sided Linear Induction Motor with Squirrel-Cage and Solid-Steel Reaction (List continued on next page.)

Primary Examiner—Margaret A. Focarino
Assistant Examiner—Joseph D. Pape

[57] ABSTRACT

A reaction rail assembly, for forming a secondary of linear induction motor, includes an elongate conductive member of uniform cross-section, and core formed from a plurality of elongate bars. The bars extend parallel to the conductive member, and adjacent bars are insulated from one another, so as to reduce eddy current losses. The bars have corresponding width and height, and can be square. The core is located adjacent the conductive member, so as, in use, to complete a magnet circuit between a primary and secondary of a linear induction motor.

24 Claims, 3 Drawing Sheets

OTHER PUBLICATIONS

Rails; Tony R. Eastham and Roger M. Katz; Jun. 1980.
Single-Sided Linear Induction Motors with Cage and Solid-Steel Reaction Rails for Integrated Magnetic Suspension and Propulsion of Guided Ground Transport; Roger M. Katz and Tony R. Eastham; IEEE 1980; pp. 262-269.

The Comparative Performance of Single-Sided Linear Induction Motors with Squirrel-Cage, Solid-Steel and Aluminum-Capped Reaction Rails; Graham E. Dawson and Tony R. Eastham; IEEE 1981; pp. 323-329.

Voltage-Controlled 60 HZ Linear Induction Motor Drives; A. R. Eastham, G. E. Dawson, V. I. John, A. M. A. Kamar and P. C. Sen; Electric Machines and Power Systems, 1983; pp. 487-497.

The Influence of Secondary Solid Ferromagnetic Plate Thickness on the Performance of Single-Sided Linear Induction Motors; J. F. Gieras, A. R. Eastham and G. E. Dawson; Electric Machines and Power Systems, 1985; pp. 67-77.

The Influence of Conductive Cap Thickness on the Performance of Single-Sided Linear Induction Motors; J. F. Gieras, A. R. Eastham and G. E. Dawson; Electric Machines and Power Systems, 1986; pp. 125-136.

Linear Motion Electromagnetic Systems; I. Boldea and S. A. Nasar; 1985; pp. 79-87.

Electric Energy Conversion and Transmission; Syed A. Nasar; 1985, pp. 79, 80.

Magnetic Devices: Transducers, Transformers and Machines; Gordon R. Slemon; 1966, p. 124.

Alternating Current Machines; M. G. Say; 1976, pp. 30, 31.

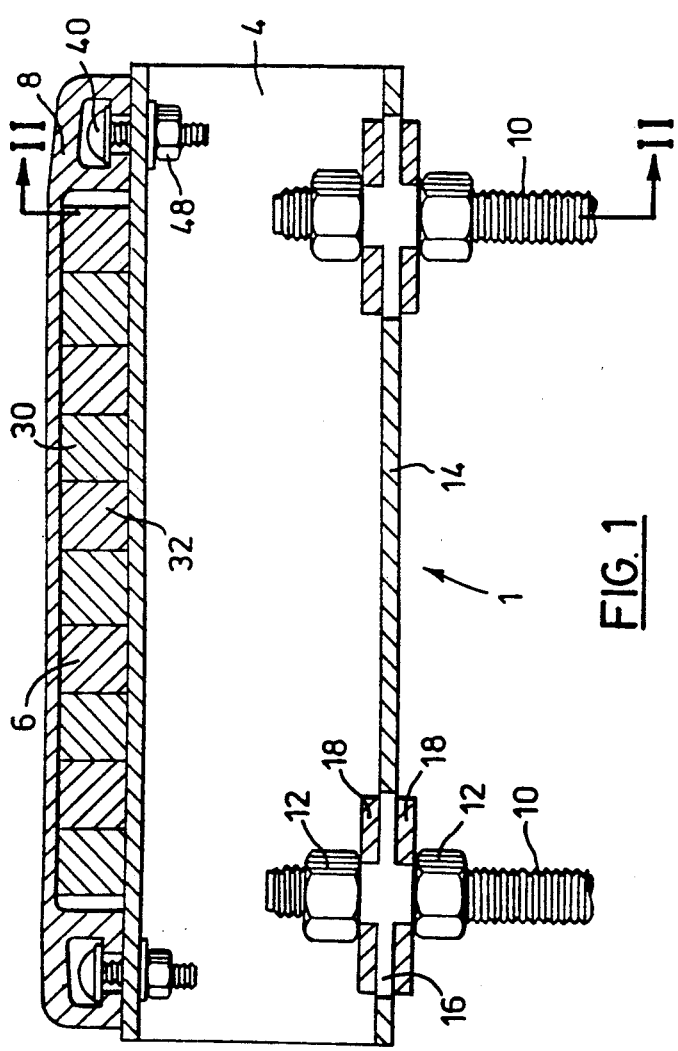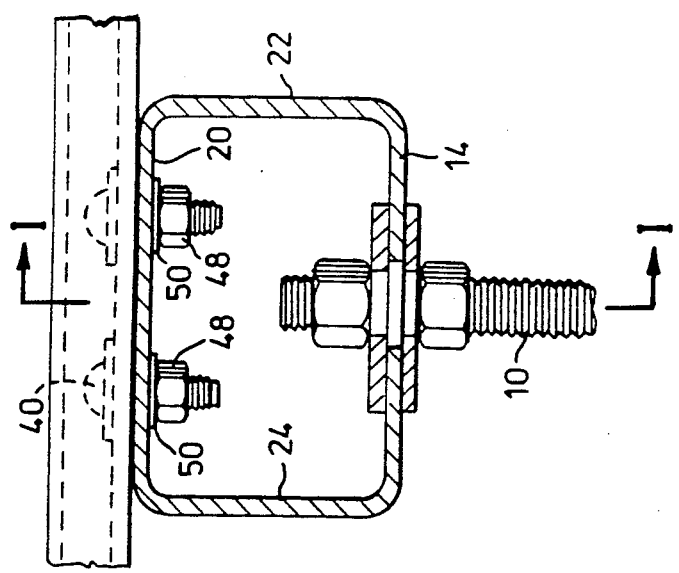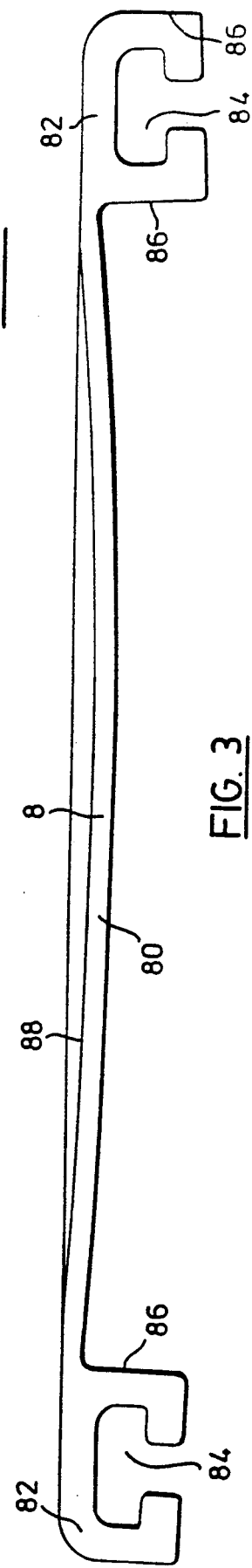

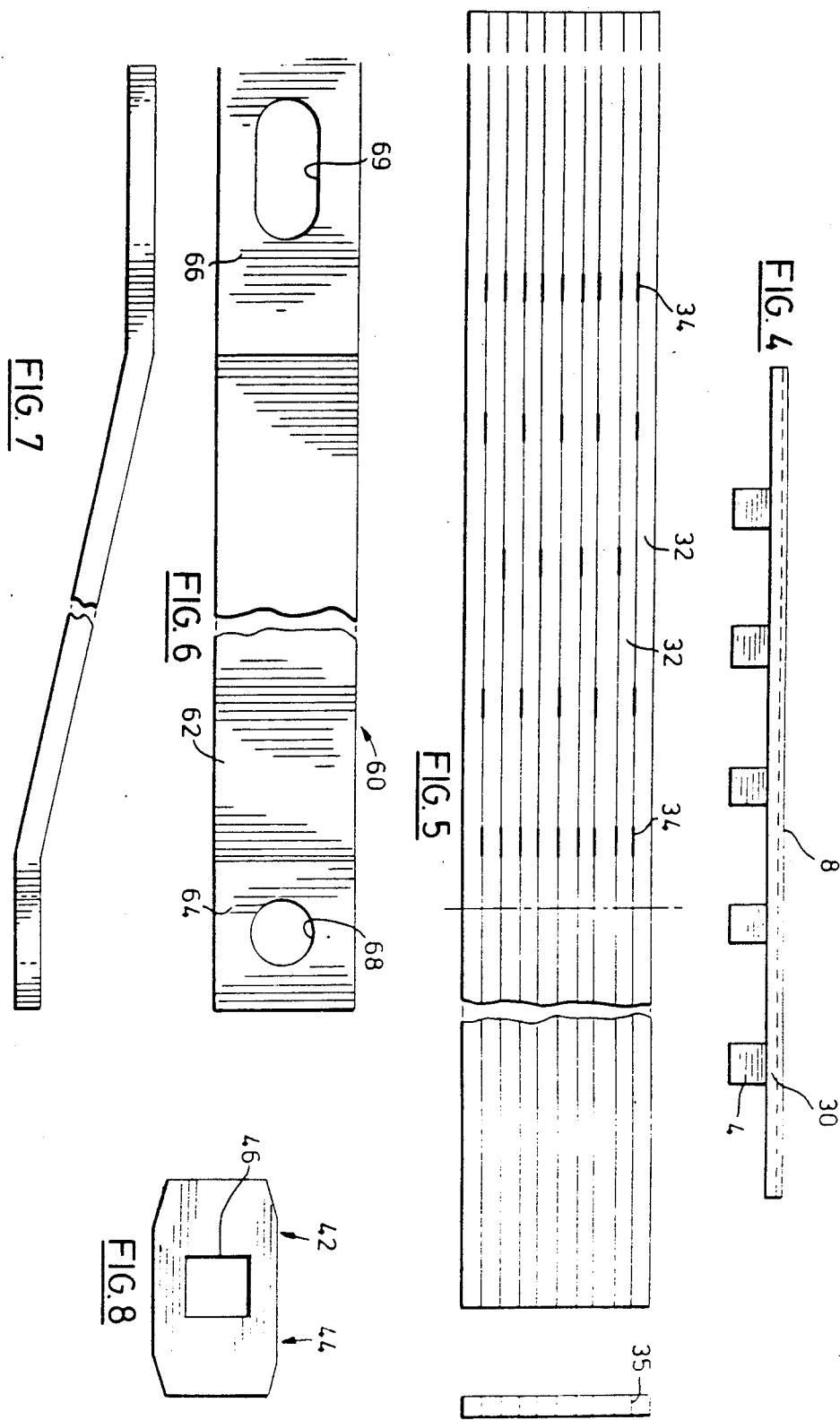

REACTION RAIL

This application is a continuation of application Ser. No. 07/367,586 filed on Jun. 19, 1989 now abandoned, which was a continuation of Ser. No. 07/087,127 filed Aug. 18, 1987, now abandoned, which was a continuation of Ser. No. 06/740,796 filed Jun. 3, 1985, now abandoned.

FIELD OF THE INVENTION

This invention relates to a reaction rail. This invention more particularly relates to a reaction rail for a transit system, which utilizes tracked vehicles powered by linear induction motors (LIMs).

BACKGROUND OF THE INVENTION

One form of electrical drive for transit vehicles is the linear induction motor. Linear induction motors offer the advantage of mechanical simplicity, with consequent reduced maintenance requirements and greater reliability. Such a linear induction motor has a primary and a secondary, one of which is carried by the vehicle, and the other of which is provided in elongate form along the track.

For transit systems, it is common to provide the linear induction motor primary, which is supplied with the drive current, on the vehicle itself. The secondary is then provided along the track. The secondary is, in this case, a passive component of the system, which provides a low reluctance path for the magnetic field and a low resistivity facing material which enables the necessary induction currents to be generated. This enables the required thrust between the primary and the secondary to be generated.

It is to be appreciated that, since the secondary extends along the full length of the track, it is important that the secondary should be as cheap and economical as possible. Any construction that is excessively elaborate, will have a significant effect on the overall cost of a transit system. At the same time, the magnetic and electrical properties of the secondary should be as optimum as possible, otherwise the overall efficiency of the system will be impaired.

A common configuration for the primary and secondary of the linear induction motor is the so-called single-sided linear induction motor. In this case, both the primary and the secondary have just a single planar side or surface facing each other. As compared to, for example, double-sided systems where the primary might run in a slotted secondary, this has the advantage of relative simplicity. For a transit system using railway vehicles, the secondary is formed as a reaction rail extending longitudinally between the two rails of the track. At switches and the like, small gaps can be provided in the ion rail. This has little effect on the overall efficiency on the system, whilst not affecting the layout of the tracks themselves.

A simple and cheap construction for such a reaction rail could utilize solid iron and solid aluminum. Thus, for example, one could have a continuously extruded aluminum top surface. Below this, a continuous length of iron, of appropriate magnetic properties, having the required cross-section would extend. The aluminum would provide the electrical path necessary for the currents induced by the magnetic field from the primary, whilst the iron would complete the magnetic circuit formed between the primary and the secondary. Such an arrangement has the disadvantage that unwanted eddy currents would be generated in the conductive iron impairing the effectiveness of the magnetic circuit. This factor results in a reduction in LIM performance.

As is known for rotary machines, the problem of eddy currents can be eliminated by the provision of laminated iron cores. In rotary machines, this is achieved by clamping together a large number of thin iron sheets, with thin layers of electrical insulation between. The direction of the laminations is such as to provide a relatively uninterrupted magnetic path in the required direction, whilst interrupting the paths along which eddy currents might arise. Such an arrangement can considerably reduce eddy currents.

However, for a reaction rail, which might be provided along many miles of track, such a construction is complex and costly. Theoretically, one could construct the iron core of a reaction rail from a large number of elongate strips, with insulation between, each strip being relatively thin and flexible. For a typical reaction rail, experience has shown that assembly of such an iron core requires care and special techniques. It is necessary to secure the laminations together by transverse bolts or the like.

Accordingly, it is desirable to provide a reaction rail construction, which has good electrical and magnetic properties, but which is relatively simple and economic to produce.

BRIEF SUMMARY OF THE INVENTION

In accordance with the present invention, there is provided a reaction rail assembly, for forming a secondary of a linear induction motor that includes a linear induction motor primary mounted on a vehicle, the reaction rail comprising an elongate aluminum member, which is of generally uniform cross-section and is adapted to be secured to a track and which has a surface that, in use, faces a corresponding surface of a linear induction motor primary, and a ferromagnetic core comprising a plurality of elongate bars, extending parallel to the aluminum member, with adjacent bars being insulated from one another across the reaction rail so as to reduce eddy current losses and with the bars of the core being located adjacent the conductive member whereby, in use, the core completes a magnetic circuit formed between the primary and secondary of the linear induction motor, and wherein each bar has a thickness substantially greater than five millimetres and the thickness of the bars is selected so that the linear induction motor primary provides a desired thrust performance relative to and comparable to the theoretical maximum thrust performance obtainable.

It is to be appreciated that conventional teaching in this field is that thin laminations should be used. Typically, such laminations will have a thickness of the order of one millimetre, although the outer range of lamination thicknesses is 0.5 to 5 millimetres. Accordingly, the reference in the specification and claims to five millimetres is to define the bars as having a thickness greater than the thickness of laminations of conventional electrical machines of the same type.

The invention is based on the realization that, contrary to conventional theory, one can obtain a thrust performance close to the theoretical maximum without having to use thin laminations. Further, the invention enables a reaction rail assembly to be tailored to give a desired performance.

As a result of extensive testing, it has been discovered that a provision of numerous relatively narrow laminations in the ferromagnetic core are not necessary. As detailed below, it has been discovered that a relatively simple theory can be used to calculate the effective resistivity of the iron core as a function of lamination thickness. This calculation, combined with an analysis of the electromagnetic fields in a 2 dimensional longitudinal cross section of the motor, show that under the type of operating conditions seen by this type of LIM, relatively thick bars can provide similar performance to configurations having "ideal" (zero conductivity) iron. In contrast to known constructions, this enables a cheap and simple construction to be used for the core, whilst maintaining the eddy current losses at an acceptable low level.

For example, the core may be constructed from a single or plurality of economical mill run iron bars, i.e. standard sized bars from an iron mill, of a width selected to provide a thrust and efficiency that is known and determined from the teachings of the present invention. The depth can be selected, in accordance with known theory, to provide full flux penetration. The bars could simply be welded together by a predetermined pattern of short weld beads, along their underside. There is no need to provide elaborate and complex mounting arrangements to maintain each bar in position, as is common for laminated constructions.

The conductive member can be formed with a profile such that, when assembled together with the core along a track, the conductive member or top cap is pre-stressed as as to be urged against the core. The purpose of this is to ensure that the conductive member is always located adjacent the core, and consequently undergoes little movement in use. This is important, as there is usually a relatively close spacing between the outer surface of the conductive member and the corresponding surface of a vehicle-born primary. It has been found with "flat profile" top cap extrusions that the mechanical forces at the lateral edges due to tightening of the hold-down bolts can cause the top-cap to bow upwards (away from the back-iron) at the centre. This situation leads to reduced mechanical clearance between the LIM primary and top cap surface. It also contributes to an increase in acoustic noise due to the effects of small, audible frequency mechanical vibrations which occur when the LIM primary passes. By prestressing the top cap during assembly, it should always firmly abut the iron core.

BRIEF DESCRIPTION OF THE DRAWINGS

For a better understanding of the present invention and to show more clearly how it may be carried into effect, reference will now be made, by way of example, to the accompanying drawings, which show a preferred embodiment of the present invention and in which:

FIG. 1 shows a transverse section through a reaction rail assembly, along line 1—1 of FIG. 2;

FIG. 2 shows a cross-section of the reaction rail assembly of FIG. 1, along the line II—II of FIG. 1;

FIG. 3 shows a cross-section of a conductive member forming part of the reaction rail of FIGS. 1 and 2, on a larger scale;

FIG. 4 shows a side view of the reaction rail assembly of FIGS. 1 and 2 on a smaller scale;

FIG. 5 shows a view from underneath of the core of the reaction rail assembly;

FIG. 6 shows a plan view of a thrust rod on a larger scale;

FIG. 7 shows a side view of the thrust rod of FIG. 6;

FIG. 8 shows a plan view of a key plate on a larger scale; and

Figure 9:
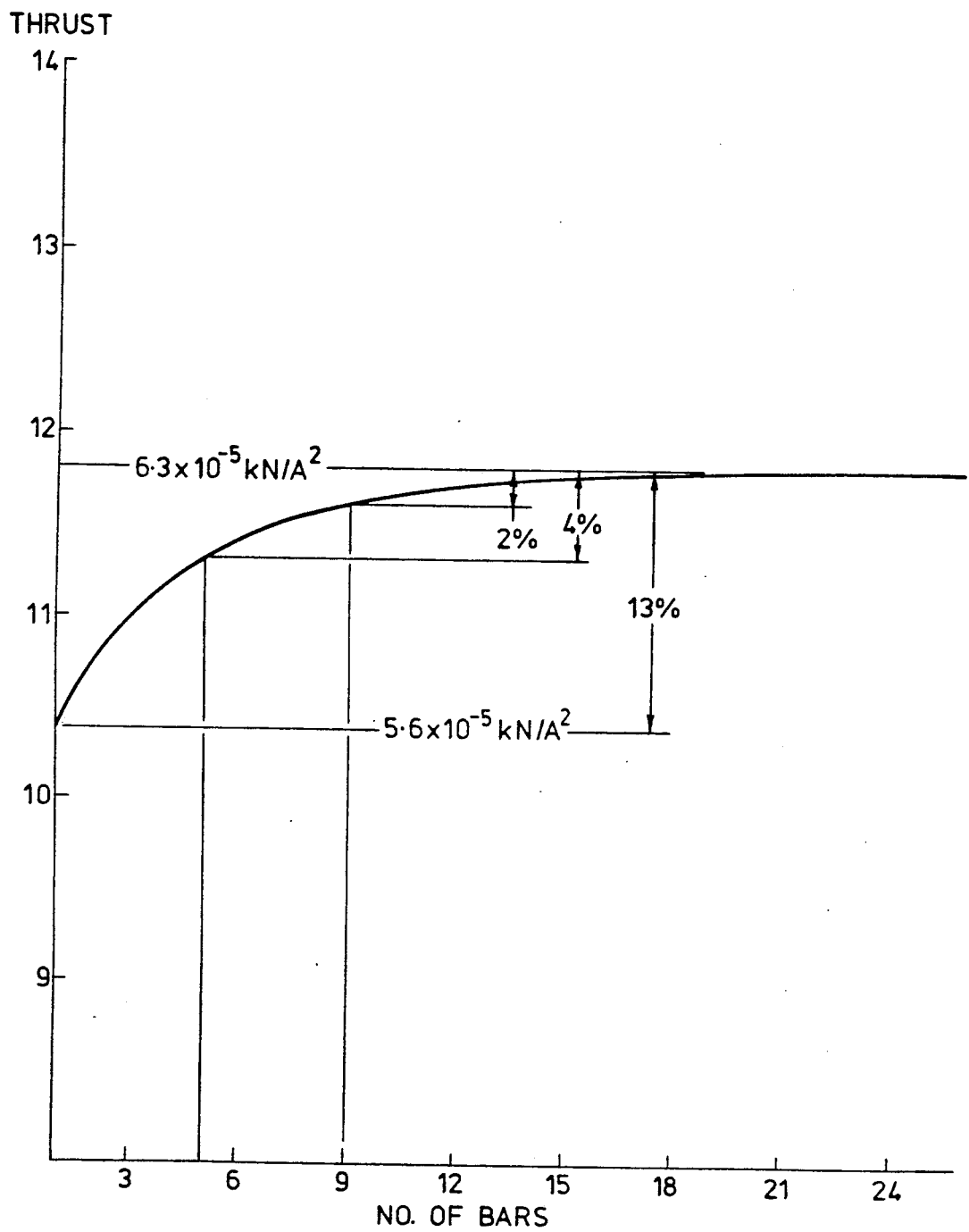
FIG. 9 shows a graph of the variation of thrust with the number of bars in the core.

Referring first to FIG. 1, there is shown a reaction rail assembly generally denoted by the reference 1. The reaction rail assembly 1 is intended for mounting on the ties of a conventional railway track or on a concrete guideway (not shown). The reaction rail 1 has ties 4, on which the working components of the reaction rail assembly 1 are mounted. On the ties 4 are elongate iron bars 6 and an elongate aluminum member or top cap 8. A primary of a linear induction motor is shown schematically at 9. The primary in use would be carried by a vehicle, so as to maintain it a predetermined minimum distance from the top cap 8. For example, the primary would be carried by a railway vehicle running on tracks on either side of the reaction rail assembly.

To secure the individual ties 4 to the ties of a conventional railway track, stud bolts 10 are provided. These are mounted at their lower ends (not shown) in the ties of a railway track. At their upper end, the stud bolts 10 each have two nuts 12. As detailed below, each tie 4 is formed from steel of hollow rectangular section, and includes a lower web 14.

In the lower web 14 there are formed two elongate slots 16. Here, on either side of the web 14, for each stud bolt 10, there are two washers 18, whose diameter is slightly less than the length of the slot 16. Thus, as shown, a web 14 is mounted at each end on a stud bolt 10 and held by the nuts 12 between a pair of washers 18. The provision of the two nuts 12 enables the vertical position of the tie 4 to be adjusted at either end to the required height. Consequently, it is possible to adjust the reaction rail 1, so that it has a uniform height both along its length and across its width, within the required tolerances.

The tie 4 includes an upper web 20, corresponding to the lower web 14, and two side webs 22, 24, forming the rectangular cross-section (see FIG. 2). At either end of the upper web 20, there are two holes formed for bolts holding the aluminum member 8 in position as described in detail below.

Referring now to FIG. 3, there is shown a cross-section through the aluminum member 8. This shows the aluminum member 8 as produced, and unstressed. The aluminum member 8 comprises a central section 80 of uniform thickness and extending almost the full width of the member 8. As shown, the central section 80 is curved so as to be slightly concave on its top surface. Along either edge of the aluminum member 8, there are two channel sections 82. Each channel section 82 has a T-shape cross-section slot 84. Sides 86 of each channel section 82 are parallel to one another, and are inclined, together with a T-shape slot 84, at an angle of 3° to the vertical. A top surface of a aluminum member 8 is denoted by the reference 88, and in use it faces a corresponding surface of a linear induction motor primary carried by a vehicle (not shown).

Referring back to FIG. 1, the reaction rail assembly 1 includes a ferromagnetic core 30. The core 30 is made up from ten individual iron bars 32 of square-cross section. FIG. 5 shows the assembly of the iron bars 32. Prior to assembling the iron bars 32, their abutting faces are primed with a non-conductive primer/varnish, for example Relvine 7901.

The iron bars 32 are then assembled together, so as to be level and free from gaps, with no twist along the length of the whole assembly. As denoted at 34 in FIG. 5, short weld beads are provided on the underside in the pattern shown. The weld pattern comprises a first transverse row including weld bead between each adjacent pair of bars. A second transverse row includes a weld bead for every other adjacent pair of bars, including the outside pairs on either side of the core. A third transverse row includes the weld bead for every other adjacent pair of bars, with no weld bead for the two outer bars. This pattern could be repeated, for example, nine times along the length of the core 30. Also, welds 35 are formed at the ends of the bars 32. After welding, the ends of the iron bars 32 are ground flush. Then, after being cleaned suitably in known manner, the core 30 is provided with a suitable protective coating, for example Copan Coal Tar Epoxy No. 10.

As shown in FIGS. 1 and 4, the core assembly 30 is placed on top of the ties 4. Then, the aluminum member 8 is placed on top of the core 30. To secure the aluminum member 8 in position, carriage bolts 40 are used. Each carriage bolt 40 has a corresponding key plate 42 as shown in FIG. 8. Each key plate 42 is elongate, and has a width indicated at 44, which is slightly less than the width of the top part of each T-shape slot 84. The length of each key plate 42 is greater than its width 44. In the centre of each key plate 42, in known manner, there is a square opening 46, corresponding to the similar square section portion of the shank of the carriage bolts 40. Prior to locating the aluminum member 8 on the ties 4, the carriage bolts 40 and associated key plates 42 are slid into position in the channel sections 82. As mentioned above, at each end of each tie 4, there are two openings for the carriage bolts 40. As shown in FIG. 2, corresponding nuts 48 are secured to the carriage bolts 40, with washers 50 between the nuts 48 and the upper web 20. The co-operation between the key plates 42 and carriage bolts 40 prevents rotation of the carriage bolts 40 as the nuts 48 are tightened.

As the carriage bolts 40 are drawn down by the nuts 48, the aluminum member 8 is prestressed to the configuration shown in FIG. 1. In this configuration, its central section 80 is maintained flat. As a result, the central section 80 maintains a constant force on the top of the core 30, and presses it against the ties 4.

The reaction rail 1 is the means by which the thrust applied to a vehicle is transferred to the track bed. Consequently, it is necessary to provide for this thrust. For this purpose, at required intervals thrust rods 60 are provided (See FIG. 6). Each thrust rod 60 is intended to extend between one of the stud bolts 10 and a tie of the conventional railway track. For this purpose, the thrust rod 60 includes a central sloped portion 62, a flat lower end portion 64 and an upper flat end portion 66. The lower flat end portion 64 includes a circular opening 68 for a bolt to secure it to a tie or concrete bed. The upper portion 66 includes a corresponding opening 69, which is elongate and intended to fit one of the stud bolts 10. The upper flat end portion 66 would be received below the web 14 and above the lower washer 18.

Turning to FIG. 9, there is shown a graph, which shows the variation of thrust with the number of iron bars 32. In this graph, the vertical axis denotes the thrust, whilst the horizontal axis gives the number of iron bars. The curve shown is derived from a theoretical analysis, based upon the application of the following theory to a two-dimensional electromagnetic field analysis of the motor.

It is assumed that the current in the core follows rectangular paths. For each path, the length is equal to the core-pitch and the width is equal to the width of the corresponding bar, so that the overall width for the paths equals the width of the core 30. Further, it is assumed that sub-dividing the core into separate bars or elements forces the current paths to be contained within each bar, thereby increasing the total effective length of the current path. Also, it is assumed the depth of penetration of current into the iron is constant for a number of bars 32.

Now, for each bar 32, as viewed in plan, the resistance can be calculated from the following equation:

$$R\ BAR = K\ (2L + 2w)$$

$$K = Constant$$

$$L = Length\ (pole\ pitch)$$

$$w = Width\ of\ iron\ bar$$

$$R\ BAR = Effective\ resistance\ of\ iron\ bar$$

consequently, the resistance of the whole core 30 is given by:

$$R\ CORE = N \times R\ BAR = K(2NL + 2Nw)$$

$$or\ R\ CORE = 2K(NL + W)$$

$$R\ CORE = Resistance\ of\ whole\ core$$

$$N = Number\ of\ iron\ bars$$

$$W = Width\ of\ core$$

thus, the resistance of the core 30 to eddy currents depends on the width of the core 30, and the product of the number of bars 32 and the pole pitch. Consequently, for a small pole pitch, the width will be dominating, and there will have to be a large number of bars 32 to significantly increase the resistance. On the other hand, for a large pole pitch, the resistance will approximately vary in proportion to the number of bars 32.

FIG. 9 shows a theoretical calculation of the variation in thrust for a typical LIM motor. Whilst the above discussion shows a proportional relationship between resistance and number of bars, as FIG. 9 shows there is a curved characteristic for the thrust variation with the number of bars. The maximum obtainable thrust is 11.8 KN. This is achieved with a large number of bars 32, so that there is little or no eddy currrent loss. As the number of bars 32 is reduced, then the eddy current loss begins to effect the thrust. As shown, with 18 bars 32, the thrust is close to the theoretical maximum. For 9 bars 32, the thrust obtainable is still only 2% below the maximum. Whilst for five bars, the thrust is reduced by 4%. If one has one bar, i.e. a solid iron core, then the thrust is reduced by 13%. Using this analysis, in this embodiment of the present invention, it was established that ten bars 32 would be sufficient. This has the advantage of producing a thrust loss of less than 2%, which is quite acceptable. Simultaneously, the construction employed is considerably simpler than that including a large number of narrow laminations. One has bars 32 of square cross-section, each of which is relatively sturdy and self-supporting. One needs simply weld the bars 32 together on their undersides at a number of locations, to form the core 30. (Strictly of course the welds will provide flux paths and electrical interconnections between the bars 32, but in practice this effect is neglible because of their remoteness from the flux paths).

It will thus be seen that the overall construction of the present invention provides for a reaction rail that is relatively simple. It has a small number of components, and can be assembled quickly and simply. Provision is made at various points for accomodating large tolerances. Thus, the thrust rods 60 include elongate openings 69, to accomodate longitudinal displacement relative to the studs 10. Similarly, to position the ties 4 accurately, the elongate slots 16 are provided, so that the transverse position of the ties 4 can be adjusted as required. The longitudinal position of the ties 4 does not matter. The nuts 12 enable the reaction rail 1 to be placed at exactly the required height, both along its length and across its width. The nuts 12 are tightened relatively tightly, to make a secure construction. The nuts 48 for the carriage bolts 40 are tightened to a relatively low torque, for example 10 ft-lbs. This permits longitudinal thermal expansion and contraction of the aluminum member 8, by sliding movement relative to the ties 4.

It is to be appreciated that whilst a preferred embodiment of the present invention has been described, many variations of the structure are possible. In particular, the arrangement of ties and bolts supporting the ties could be simplified. There may be installations in which a guide way is sufficiently accurately formed, to enable a reaction rail to be bolted directly to it, or via simple adjusting mechanisms, thus simplifying the design.

The stud bolts 10 are $\frac{3}{4}''$ in diameter and 7 3/16" long. The washers 18 are 2" in diameter, $\frac{1}{4}''$ thick, and have an internal diameter of 13/16". The thrust rods 60 have a sloped central portion 62 that is approximately $16\frac{7}{8}''$ long. The lower portion 62 is approximately 2" long, with a $\frac{7}{8}''$ of an inch diameter opening 68. The upper flat end portion 66 is 4 $\frac{1}{8}''$ long, with a slot that is 2" long and $\frac{5}{8}''$ wide. The thrust rod 60 is 2" wide and $\frac{3}{8}''$ thick. The key plate 42 has a square opening of 7 1/16" side. The key plate 42 is $1\frac{1}{2}''$ long and $\frac{7}{8}''$ wide, with its corners cut to an angle of 15° relative to the sides. The key plate 42 can be $\frac{1}{4}''$ thick.

The ties 4 of a rectangular section that is 6" wide and 4" deep, with a wall thickness of $\frac{1}{4}''$. These dimensions need not be exact. The slots 16 are $\frac{7}{8}''$ wide and $2\frac{7}{8}''$ long. For the carriage bolts 40, there are four openings of $\frac{1}{2}''$ diameter. Additional means, such as a vent hole, can be provided, in the ties as required.

The carriage bolts 10 have a $\frac{3}{8}''$ diameter and are $1\frac{1}{4}''$ long.

Each of the iron bars 32 forming the core 30 is 1" square. For the aluminum member 8, forming a top cap of the reaction rail 9, the overall width is approximately 14", with a width between the channel sections 82 of $10\frac{1}{4}''$, to accomodate the core 30. The central section 80 is approximately 3/16" thick, and in the unstressed condition, its centre is displaced downwards by 3/16" relative to the channel sections 82. Each channel section 82 is approximately 1 3/16" deep, and 1 11/16" wide. The T-shape slots 84 are approximately $\frac{7}{8}''$ deep, 7/16" wide at their necks and 1 1/16" wide at their upper portions.

We claim:

1. A reaction rail assembly for forming a secondary of a linear induction motor that includes a linear induction motor primary mounted on a vehicle, the reaction rail comprising an elongate conductive member which is of generally uniform cross-section and is adapted to be secured to a track and which has a surface that, in sue, faces a corresponding surface of a linear induction motor primary, and a core comprising a plurality of elongate bars of ferromagnetic material arranged side by side across the core and extending parallel to the conductive member, with adjacent bars being generally insulated from one another across the reaction rail so as to reduce eddy current losses and with the bars of the core being located adjacent the conductive member whereby, in use, the core completes a magnetic circuit formed between the primary and the secondary of the linear induction motor, wherein each bar has a thickness of substantially about 1 to 2 inches.

2. A reaction rail assembly for forming a secondary of a linear induction motor that includes a linear induction motor primary mounted on a vehicle, the reaction rail comprising an elongate conductive member which is of generally uniform cross-section and is adapted to be secured to a track and which has a surface that, in use, faces the corresponding surface of a linear induction motor primary, and a core comprising a plurality of elongate bars of ferromagnetic material arranged side by side across the core and extending parallel to the conductive member and welded together by a repeated pattern of short weld beads along the bottom surface of the core remote from the conductive member, with adjacent bars being otherwise generally insulated from one another across the reaction rail so as to reduce eddy current losses, the core being located adjacent the conductive member whereby, in use, the core completes a magnetic circuit formed between the primary and the secondary of the linear induction motor.

3. A reaction rail assembly for forming a secondary of a linear induction motor that includes a linear induction motor primary mounted on a vehicle, the reaction rail comprising an elongate conductive member which is of generally uniform cross-section and is adapted to be secured to a track and which has a surface that, in use, faces a corresponding surface of a linear induction motor primary, and a core comprising a plurality of elongate bars of ferromagnetic material arranged side by side across the core and extending parallel to the conductive member, with adjacent bars being generally insulated from one another across the reaction rail so as to reduce eddy current losses and with the bars of the core being located adjacent the conductive member whereby, in use, the core completes a magnetic circuit formed between the primary and the secondary of the linear induction motor, and wherein each bar has a thickness substantially greater than five millimetres so that the linear induction motor primary provides a desired thrust performance relative to the theoretical maximum thrust performance, and wherein the elongate bars are welded together by a repeated pattern of short weld beads along a bottom surface of the core remote from the conductive member.

4. A reaction rail as claimed in claim 1 or 2, wherein the bars of the ferromagnetic material are so dimensioned that the thrust reduction due to eddy current losses obtained by the linear induction motor is less than 2% of the maximum theoretically obtainable thrust with no eddy current losses.

5. A reaction rail assembly for forming a secondary of a linear induction motor that includes a linear induction motor primary mounted on a vehicle, the reaction rail comprising an elongate conductive member which is of generally uniform cross-section and is adapted to be secured to a track and which has a surface that, in use, faces a corresponding surface of a linear induction motor primary, nd a core comprising a plurality of elongate bars of ferromagnetic material arranged side by side across the core and extending parallel to the conductive member, with adjacent bars being generally insulated from one another across the reaction rail so as to reduce eddy current losses and with the bars of the core being located adjacent the conductive member whereby, in use, the core completes a magnetic circuit formed between the primary and the secondary of the linear induction motor, wherein each bar has a substantial thickness so that the linear induction motor primary provides a desired thrust performance relative to the theoretical maximum thrust performance, and wherein the elongate bars are welded together by a repeated pattern of short weld beads along the bottom surface of the bars remote from the conductive member, which repeated pattern comprises a plurality of rows of weld beads, each row extending transversely of the elongate bars and including a plurality of weld beads, and the rows being uniformly spaced from one another.

6. A reaction rail as claimed in claim 5, wherein the repeated pattern of short weld beads comprises a first transverse row including a short weld bead between each adjacent pair of elongate bars, a second transverse row of short weld beads comprising a weld bead for every other adjacent pair of bars includign the outside pairs on either side of the core, and a third transverse row of weld beads which includes a weld bead for every other adjacent pair of bars with no weld bead for the two outer bars of the core.

7. A reaction rail as claimed in claim 2 or 6, wherein adjacent elongate bars, apart from the weld beads, are electrically insulated by a layer of insulation, and the core is coated with a protective coating.

8. A reaction rail assembly for forming a secondary of a linear induction motor which includes a linear induction motor primary mounted on a vehicle, the reaction rail comprising an elongate conductive member which has a generally uniform transverse cross-section comprising a central section of uniform thickness and two slotted channel sections at either side, the channel sections including slots that open downwards, and which conductive member is adapted to be secured to a track and has a surface that, in sue, faces a corresponding surface of a linear induction motor primary, and a core comprising a plurality of elongate bars of ferromagnetic material arranged side by side across the core and extending parallel to the conductive member, with adjacent bars being generally insulated from one another across the reaction rail so as to reduce eddy current losses and with the core being located adjacent to the conductive member whereby, in use, the core completes a magnetic circuit formed between the primary and the second of the linear induction motor, wherein each bar has a thickness of substantially about 1 to 2 inches.

9. A reaction rail assembly for forming a secondary of a linear induction motor that includes a linear induction motor primary mounted on a vehicle, the reaction rail comprising an elongate conductive member which is of generally uniform cross-section and is adapted to be secured to a track and which has a surface that, in use, faces a corresponding surface of a linear induction motor primary, and a core comprising a plurality of elongate bars of ferromagnetic material arranged side by side cross the core and extending parallel to the conductive member, with adjacent bars being generally insulated from one another across the reaction rail so as to reduce eddy current losses and with the bars of the core being located adjacent the conductive member whereby, in use, the core completes a magnetic circuit formed between the primary and the secondary of the linear induction motor, wherein each bar has a substantial thickness so that the linear induction motor primary provides a desired thrust performance relative to the theoretical maximum thrust performance, and wherein the central section of the conductive member, when unstressed, is curved downwards, so that, in the complete assembly, the central section is pre-stressed and maintained pressed against the core.

10. A reaction rail assembly as claimed in claim 8, wherein each of the channel sections includes a T-shape slot opening downwards, for receiving heads of bolts.

11. A reaction rail assembly as claimed in claim 8, wherein the channel sections include T-shape slots which open downwards, and wherein carriage bolts and associated key plates are located in the T-shape slots, the key plates preventing rotation of the carriage bolts.

12. A reaction rail assembly as claimed in claim 8, which includes ties, on which the core is mounted and to which the conductive member is secured.

13. A reaction rail assembly as claimed in claim 8, wherein the conductive member is formed from aluminium.

14. A reaction rail assembly for forming a secondary of a linear induction motor that includes a linear induction motor primary mounted on a tracked vehicle, the reaction rail assembly comprising: a plurality of ties, each of which is of hollow rectangular construction and is adapted to be secured along a track; a core for completing a magnetic circuit between the primary and the secondary, the core comprising a plurality of elongate bars of ferromagnetic material which are arranged side by side across the core and which extend parallel to one another across the ties and are separated by insulation so as to reduce eddy current losses wherein each bar has a thickness greater than the thickness of conventional ferromagnetic laminations for elevation machines of the same type; an elongate conductive member provided on top of the core and including along either side elongate channels of T-shape section; and bolts received in said channels and secured to the ties to secure the conductive member and the core in position.

15. A reaction rail assembly as claimed in claim 14, wherein the conductive member includes a central section extending between said channel sections, the central section being curved downwards when unstressed, so that, in the complete assembly, the central section is prestressed and maintained pressed against the core, and wherein each bar has a width and a height, with the width being at least a substantial part of the height.

16. A reaction rail as claimed in claim 2 or 3, wherein the weld pattern includes weld beads at the ends of the bars.

17. A reaction rail as claimed in claim 1 or 2, wherein the bars of ferromagnetic material are so dimensioned that the thrust reduction due to eddy current losses obtained by the linear induction motor primary is less than four percent of the maximum theoretically obtainable thrust with no eddy current losses.

18. A reaction rail as claimed in claim 1, which has nine bars of ferromagnetic material.

19. A reaction rail as claimed in claim 1, which has five bars of ferromagnetic material.

20. A reaction rail as claimed in claim 1, which has at least nine bars of ferromagnetic material, and wherein the thrust reduction due to eddy current losses obtained by the linear induction motor primary is less than two percent of the maximum theoretically obtainable thrust with no eddy current losses.

21. A reaction rail as claimed in claim 1, which has five bars of ferromagnetic material, and wherein the thrust reduction due to eddy current losses obtained by the linear induction motor primary is less than four percent of the maximum theoretically obtainable thrust with no eddy current losses.

22. A reaction rail as claimed in claim 1, which includes up to five bars and gives a thrust reduction due to eddy current losses which is between 4 and 13 percent of the maximum theoretically obtainable thrust with no eddy current losses.

23. The reaction rail of claim 1 wherein each said bar has a thickness of substantially about one inch.

24. The reaction rail of claim 8 wherein each said bar has a thickness of substantially about one inch.

* * * * *